US010348638B2

(12) United States Patent
Abhigyan et al.

(10) Patent No.: US 10,348,638 B2
(45) Date of Patent: Jul. 9, 2019

(54) CREATING CROSS-SERVICE CHAINS OF VIRTUAL NETWORK FUNCTIONS IN A WIDE AREA NETWORK

(71) Applicant: AT&T Intellectual Property I, L.P., Atlanta, GA (US)

(72) Inventors: Abhigyan, Somerset, NJ (US); Kaustubh Joshi, Scotch Plains, NJ (US); Richard Schlichting, New Providence, NJ (US); Matti Hiltunen, Morristown, NJ (US); Yoji Ozawa, Yokohama (JP)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/608,371

(22) Filed: May 30, 2017

(65) Prior Publication Data

US 2018/0351874 A1     Dec. 6, 2018

(51) Int. Cl.
*H04L 12/28*     (2006.01)
*H04L 12/911*     (2013.01)
(Continued)

(52) U.S. Cl.
CPC .......... *H04L 47/70* (2013.01); *H04L 12/4641* (2013.01); *H04L 45/34* (2013.01);
(Continued)

(58) Field of Classification Search
CPC ......... H04L 47/80; H04L 47/70; H04L 67/42; H04L 67/10; H04L 12/0641; H04L 41/0893
(Continued)

(56) References Cited

U.S. PATENT DOCUMENTS 8,074,218 B2    12/2011   Eilam et al.
8,296,433 B2    10/2012   Stevens et al.
(Continued)

FOREIGN PATENT DOCUMENTS

CN       105429806      3/2016
EP        2894820       7/2015
(Continued)

OTHER PUBLICATIONS

Scholler et al., "Resilient deployment of virtual network functions," 2013 5th International Congress on Ultra Modern Telecommunications and Control Systems and Workshops, Sep. 10-13, 2013, pp. 208-214, IEEE 2013.
(Continued)

*Primary Examiner* — Faisal Choudhury
(74) *Attorney, Agent, or Firm* — Hartman & Citrin LLC

(57) ABSTRACT

Concepts and technologies are disclosed herein for creating cross-service chains of virtual network functions in a wide area network. A controller can receive a chain request from a requestor. The chain request can specify functionality that is to be included in a service chain. The functionality can include a first function and a second function. The controller can compute a route associated with the service chain. The route can specify a first site that hosts a first service that provides the first function and a second site that hosts a second service that provides the second function. A first virtual network function can be located at the first site and a second virtual network function can be located at the second site. The controller can configure edge devices and forwarding devices to various entities at the two sites to enable the cross-service virtual network function chain.

20 Claims, 6 Drawing Sheets

(51) Int. Cl.
*H04L 12/721* (2013.01)
*H04L 12/46* (2006.01)
*H04L 29/06* (2006.01)
*H04L 12/751* (2013.01)
*H04L 12/24* (2006.01)
*H04L 12/927* (2013.01)
*H04L 29/08* (2006.01)

(52) U.S. Cl.
CPC .......... *H04L 67/42* (2013.01); *H04L 41/0893* (2013.01); *H04L 45/02* (2013.01); *H04L 47/80* (2013.01); *H04L 67/10* (2013.01)

(58) Field of Classification Search
USPC .......................................................... 370/396
See application file for complete search history.

(56) References Cited

U.S. PATENT DOCUMENTS

| | | | |
|---|---|---|---|
| 9,479,409 | B2 | 10/2016 | Zhang et al. |
| 9,491,063 | B2 | 11/2016 | Kempf et al. |
| 2015/0082308 | A1 | 3/2015 | Kiess et al. |
| 2015/0200838 | A1* | 7/2015 | Nadeau ................ H04L 45/124 398/58 |
| 2016/0065479 | A1 | 3/2016 | Harper et al. |
| 2016/0149771 | A1 | 5/2016 | Prasad et al. |
| 2016/0156718 | A1 | 6/2016 | Allan |
| 2016/0212012 | A1 | 7/2016 | Young et al. |
| 2016/0212016 | A1 | 7/2016 | Vrzic et al. |
| 2016/0246652 | A1 | 8/2016 | Herdrich et al. |
| 2016/0248858 | A1 | 8/2016 | Qui et al. |
| 2016/0261495 | A1* | 9/2016 | Xia ......................... H04L 45/58 |
| 2016/0294643 | A1 | 10/2016 | Kim |
| 2016/0337179 | A1 | 11/2016 | Rao |
| 2016/0353422 | A1 | 12/2016 | Vrzic et al. |
| 2017/0019302 | A1 | 1/2017 | Lapiotis et al. |
| 2017/0026235 | A1* | 1/2017 | Famaey ............... H04L 12/4641 |
| 2017/0031986 | A1 | 2/2017 | Li et al. |
| 2017/0041201 | A1 | 2/2017 | Ilyadis et al. |
| 2017/0093750 | A1* | 3/2017 | McBride ............... H04L 47/805 |

FOREIGN PATENT DOCUMENTS

| | | |
|---|---|---|
| WO | WO 2016048430 | 3/2016 |
| WO | WO 2016086991 | 6/2016 |
| WO | WO 2017/011607 | 1/2017 |
| WO | WO 2017020949 | 2/2017 |

OTHER PUBLICATIONS

Mehraghdam et al., "Specifying and Placing Chains of Virtual Network Functions," 2014 IEEE 3$^{rd}$ International Conference on Cloud Networking (CloudNet), Oct. 8-10, 2014, pp. 7-13, IEEE 2014.

Espling et al., "Modeling and Placement of Structured Cloud Services," IEEE Transactions on Network and Service Management: Special Issue on Management of Cloud Services, Jan. 31, 2013.

International Search Report and Written Opinion dated Aug. 20, 2018 issued in International Application No. PCT/US2018/034867.

* cited by examiner

CREATING CROSS-SERVICE CHAINS OF VIRTUAL NETWORK FUNCTIONS IN A WIDE AREA NETWORK

BACKGROUND

In some communications networks, services can be formed by tightly coupling multiple virtual network functions together. These services can include an ingress point, one or more virtual network functions, and an egress point. In some instances, the services can include an edge router or server that can act as an ingress point for the service, one or more virtual network functions that can provide specific functionality associated with the service, and another edge router or server that can act as an egress point for the service.

The virtual network functions of these services are tightly coupled, meaning the virtual network functions cooperate to provide a service. Some custom services can be created by determining functionality that is desired for the service and chaining together virtual network functions that provide that functionality to create a custom service. Data flows into the service via the ingress point, through the virtual network functions of that service, and out of the service via an egress point. Data cannot be injected into the service other than through the ingress point, and data cannot be extracted from the service other than through the egress point.

SUMMARY

The present disclosure is directed to creating cross-service chains of virtual network functions in a wide area network. A controller (e.g., a controller executed by a server computer or other device) can receive a request to create a cross-service chain of virtual network functions. The request can be generated by a requestor and can identify functionality desired in the cross-service virtual network function chain; specific types of virtual network functions that should be used or accessed to provide the desired functionality; types of virtual network functions that data associated with the cross-service chain should traverse and/or be routed through; and/or otherwise can specify information that can be used to determine what virtual network functions and/or services will be used to provide the functionality associated with the desired cross-service virtual network function chain. The request can include at least information that identifies or can be used to identify two or more types of functionality that is associated with two or more virtual network functions that are to be accessed to provide the functionality requested by way of the request, where at least one of the two or more virtual network functions is associated with a first of two or more services, and where a second one of the two or more virtual network functions is associated with a second of the two or more services.

The controller can determine which sites' virtual network functions are to be included in the cross-service virtual network function chain. This determination can be based on network data that can include network topology information, network availability information, availability information associated with the virtual network functions and/or data that describes functions associated with the virtual network functions, data that identifies and/or describes the services, data that identifies and/or describes the various edge servers and/or routers, other information, and/or the like. The controller can determine a high level route for the requested chain based on these or other types of data. The high level route can identify the two or more sites that the traffic should be routed to, but may not identify the actual virtual network functions that are to be accessed. The controller can configure edge devices using labeling rules. The controller can provide the labeling rules to the edge devices, and can provide routing instructions to one or more forwarders and/or other entities to provide instructions for creating and/or operating the cross-service virtual network function chains, where the forwarders can be associated with one or more of the edge devices and/or virtual network functions. The routing instructions can identify the sites to which the traffic is to be routed if the traffic is determined to be associated with the cross-service virtual network function chain.

The controller also can configure one or more virtual network functions associated with the cross-service chain of virtual network functions. The routing instructions can be provided to forwarders associated with the virtual network functions to configure the forwarders to act on the traffic in accordance with the cross-service virtual network function chain. The controller also can be configured to provide, to the edge devices, labeling rules that can be used by the edge devices to configure labeling of traffic and/or removing of labels from the traffic. The labeling rules can instruct devices as to how the traffic should be labeled and/or how labels should be removed.

A packet can arrive at an edge device and the edge device can label the packet. After labeling, the packet can flow to a forwarder associated with the edge device. The forwarder can be executed by its own virtual machine and/or by a virtual machine that hosts the edge device. Either way, the forwarder can route the packet to the first virtual network function of the cross-service chain of virtual network functions. After being routed to and/or through the virtual network function, the packet can flow to the forwarder or other device that provides forwarding functionality for the virtual network function. The forwarder (associated with the virtual network function) can route the packet to another virtual network function within the same site or to another site. Either way, the packet can be routed to a next virtual network function in the cross-service virtual network function chain. At another site, the flow can be similar, and after the packet has traversed all of the two or more virtual network functions (on two or more sites) associated with the cross-service chain of virtual network functions, the packet can flow to an egress edge server, which can remove the labels. Thus, the header of the packet can be modified by an egress edge server to remove the routing information associated with the cross-service virtual network function chain, and the packet can be returned to an access network.

According to one aspect of the concepts and technologies disclosed herein, a system is disclosed. The system can include a processor and a memory. The memory can store computer-executable instructions that, when executed by the processor, cause the processor to perform operations. The operations can include receiving a chain request that can specify functionality to be included in a service chain. The functionality can include a first function and a second function. The operations also can include identifying a first virtual network function that provides the first function and a second virtual network function that provides the second function, and computing a route associated with the service chain. The route can specify a first site that hosts a first service that can include the first virtual network function, and the route can also specify a second site that hosts a second service that can include the second virtual network function. The operations also can include configuring a first edge device associated with the first site by providing routing instructions and labeling rules to the first edge device, configuring a forwarding device associated with the first site by providing the routing instructions and the labeling rules to the forwarding device, and configuring the first virtual network function and the second virtual network function by providing the routing instructions to the first virtual network function and to the second virtual network function. A packet can traverse the service chain by traversing the first edge device, the first virtual network function, the second virtual network function, and the forwarding device.

In some embodiments, computing the route can include obtaining, from a network device, network information that can include a network topology; querying the first virtual network function and the second virtual network function to determine capacities associated with the first virtual network function and the second virtual network function; and computing, based on the network information and the capacities, the route. In some embodiments, the network device can include a network monitor, and the network information can include information that indicates availability associated with the first virtual network function and the second virtual network function.

In some embodiments, the forwarding device can be a component of a second edge device that can be associated with the second service. In some embodiments, the second edge device can include an edge server that can be associated with the second site. In some embodiments, the first service can include an ingress edge server, a plurality of virtual network functions can include the first virtual network function, and an egress edge server. In some embodiments, the first edge device can be configured to receive a packet associated with the service chain, to label the packet, and to route the packet to the first virtual network function. In some embodiments, labeling the packet can include adding the routing instructions to a header of the packet. In some embodiments, the forwarding device can be configured to remove the routing instructions from the header of the packet.

According to another aspect of the concepts and technologies disclosed herein, a method is disclosed. The method can include receiving, by a server computer that can include a processor, a chain request that can specify functionality to be included in a service chain. The functionality can include a first function and a second function. The method also can include identifying, by the processor, a first virtual network function that provides the first function and a second virtual network function that provides the second function, and computing, by the processor, a route associated with the service chain. The route can specify a first site that hosts a first service that can include the first virtual network function and a second site that hosts a second service that can include the second virtual network function. The method also can include configuring, by the processor, a first edge device associated with the first site by providing routing instructions and labeling rules to the first edge device; configuring, by the processor, a forwarding device associated with the first site by providing the routing instructions and the labeling rules to the forwarding device; and configuring, by the processor, the first virtual network function and the second virtual network function by providing the routing instructions to the first virtual network function and to the second virtual network function. A packet can traverse the service chain by traversing the first edge device, the first virtual network function, the second virtual network function, and the forwarding device.

In some embodiments, computing the route can include obtaining, from a network device, network information that can include a network topology; querying the first virtual network function and the second virtual network function to determine capacities associated with the first virtual network function and the second virtual network function; and computing, based on the network information and the capacities, the route. In some embodiments, the second edge device can include an edge server associated with the second site, and the forwarding device can be a module of the edge server. In some embodiments, the first service can include an ingress edge server, a plurality of virtual network functions can include the first virtual network function, and an egress edge server. In some embodiments, the first edge can be configured to receive a packet associated with the service chain, to add the routing instructions to a header of the packet, and route the packet to the first virtual network function.

According to yet another aspect of the concepts and technologies disclosed herein, a computer storage medium is disclosed. The computer storage medium can store computer-executable instructions that, when executed by a processor, cause the processor to perform operations. The operations can include receiving a chain request that can specify functionality to be included in a service chain. The functionality can include a first function and a second function. The operations also can include identifying a first virtual network function that provides the first function and a second virtual network function that provides the second function, and computing a route associated with the service chain. The route can specify a first site that hosts a first service that can include the first virtual network function, and the route can also specify a second site that hosts a second service that can include the second virtual network function. The operations also can include configuring a first edge device associated with the first site by providing routing instructions and labeling rules to the first edge device, configuring a forwarding device associated with the first site by providing the routing instructions and the labeling rules to the forwarding device, and configuring the first virtual network function and the second virtual network function by providing the routing instructions to the first virtual network function and to the second virtual network function. A packet can traverse the service chain by traversing the first edge device, the first virtual network function, the second virtual network function, and the forwarding device.

In some embodiments, computing the route can include obtaining, from a network device, network information that can include a network topology; querying the first virtual network function and the second virtual network function to determine capacities associated with the first virtual network function and the second virtual network function; and computing, based on the network information and the capacities, the route. In some embodiments, the second edge device can include an edge server associated with the second site, and the forwarding device can be a module of the edge server. In some embodiments, the first service can include an ingress edge server, a plurality of virtual network functions that can include the first virtual network function, and an egress edge server. In some embodiments, the first edge device can be configured to receive a packet associated with the service chain, to add the routing instructions to a header of the packet, and to route the packet to the first virtual network function.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
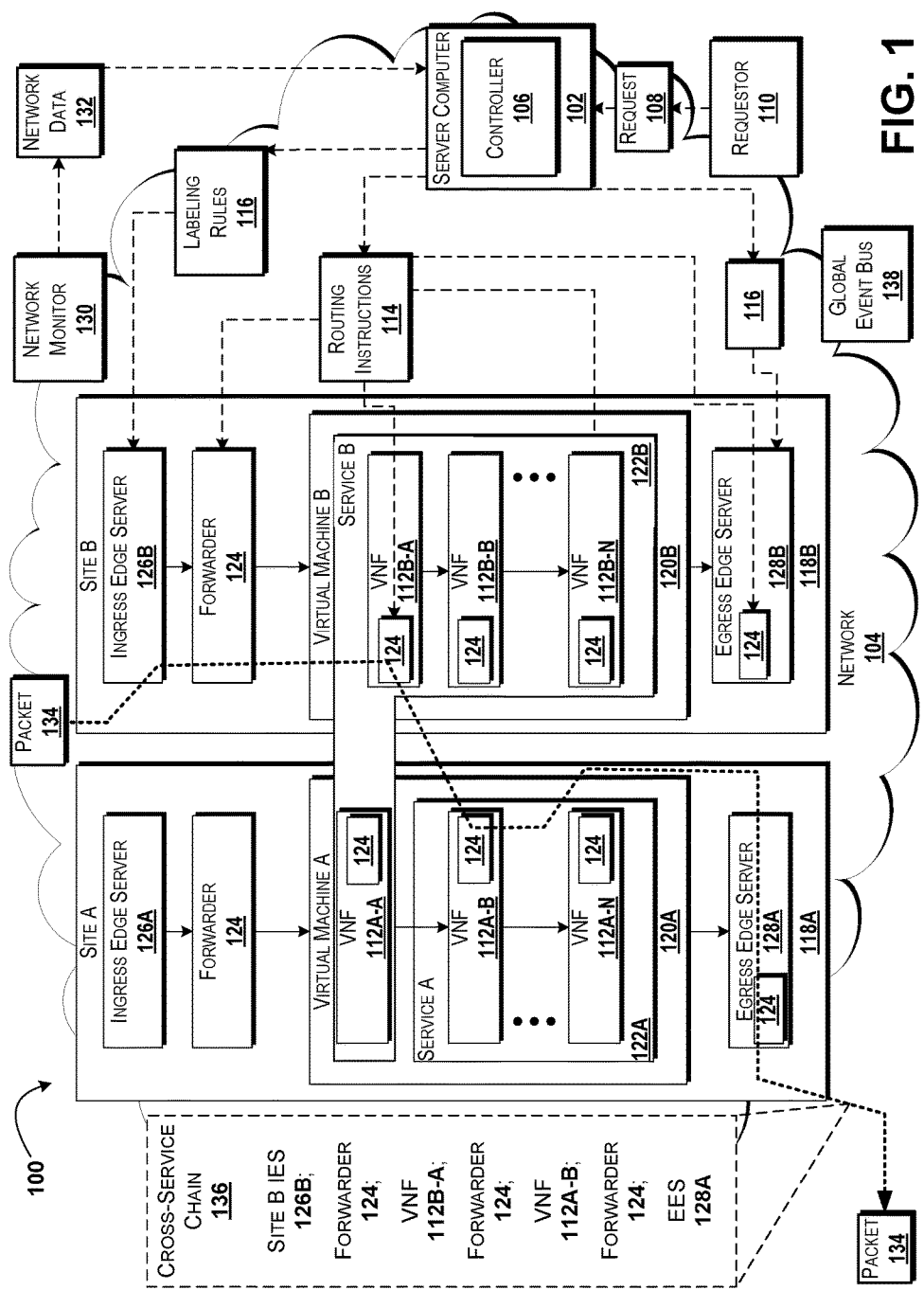
FIG. 1 is a system diagram illustrating an illustrative operating environment for various embodiments of the concepts and technologies described herein.

The following detailed description is directed to creating cross-service chains of virtual network functions in a wide area network. A controller (e.g., a controller executed by a server computer or other device) can receive a request to create a cross-service chain of virtual network functions. The request can be generated by a requestor and can identify functionality desired in the cross-service virtual network function chain; specific types of virtual network functions that should be used or accessed to provide the desired functionality; types of virtual network functions that data associated with the cross-service chain should traverse and/ or be routed through; and/or otherwise can specify information that can be used to determine what virtual network functions and/or services will be used to provide the functionality associated with the desired cross-service virtual network function chain. The request can include at least information that identifies or can be used to identify two or more types of functionality that is associated with two or more virtual network functions that are to be accessed to provide the functionality requested by way of the request, where at least one of the two or more virtual network functions is associated with a first of two or more services, and where a second one of the two or more virtual network functions is associated with a second of the two or more services.

The controller can determine which sites' virtual network functions are to be included in the cross-service virtual network function chain. This determination can be based on network data that can include network topology information, network availability information, availability information associated with the virtual network functions and/or data that describes functions associated with the virtual network functions, data that identifies and/or describes the services, data that identifies and/or describes the various edge servers and/or routers, other information, and/or the like. The controller can determine a high level route for the requested chain based on these or other types of data. The high level route can identify the sites that the traffic should be routed to, but may not identify the actual virtual network functions that are to be accessed. The controller can configure edge devices using labeling rules. The controller can provide the labeling rules to the edge devices, and can provide routing instructions to one or more forwarders and/or other entities to provide instructions for creating and/or operating the cross-service virtual network function chains, where the forwarders can be associated with one or more of the edge devices and/or virtual network functions. The routing instructions can identify the sites to which the traffic is to be routed if the traffic is determined to be associated with the cross-service virtual network function chain.

The controller also can configure one or more virtual network functions associated with the cross-service chain of virtual network functions. The routing instructions can be provided to forwarders associated with the virtual network functions to configure the forwarders to act on the traffic in accordance with the cross-service virtual network function chain. The controller also can be configured to provide, to the edge devices, labeling rules that can be used by the edge devices to configure labeling of traffic and/or removing of labels from the traffic. The labeling rules can instruct devices as to how the traffic should be labeled and/or how labels should be removed.

A packet can arrive at an edge device and the edge device can label the packet. After labeling, the packet can flow to a forwarder associated with the edge device. The forwarder can be executed by its own virtual machine and/or by a virtual machine that hosts the edge device. Either way, the forwarder can route the packet to the first virtual network function of the cross-service chain of virtual network functions. After being routed to and/or through the virtual network function, the packet can flow to the forwarder or other device that provides forwarding functionality for the virtual network function. The forwarder (associated with the virtual network function) can route the packet to another virtual network function within the same site or to another site. Either way, the packet can be routed to a next virtual network function in the cross-service virtual network function chain. At another site, the flow can be similar, and after the packet has traversed all virtual network functions associated with the cross-service chain of virtual network functions, the packet can flow to an egress edge server, which can remove the labels. Thus, the header of the packet can be modified by an egress edge server to remove the routing information associated with the cross-service virtual network function chain, and the packet can be returned to an access network.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for creating cross-service chains of virtual network functions in a wide area network will be described, according to an illustrative embodiment. The operating environment 100 shown in FIG. 1 can include a server computer 102. The server computer 102 can operate in communication with and/or as part of a communications network ("network") 104. It should be understood that the network 104 can be and/or can include a wide area network and one or more other networks that are in communication with the wide area network such as transport networks, private networks, and the like. It therefore should be understood that the illustrated embodiment is illustrative and therefore should not be construed as being limiting in any way.

According to various embodiments, the functionality of the server computer 102 may be provided by one or more server computers, desktop computers, laptop computers, other computing systems, combinations thereof, or the like. It should be understood that the functionality of the server computer 102 can be provided by a single device, by two similar devices, and/or by two or more dissimilar devices. For purposes of describing the concepts and technologies disclosed herein, the server computer 102 is described herein as a server computer having a data storage device (not labeled in FIG. 1) and a processor (not labeled in FIG. 1). It should be understood that this embodiment is illustrative, and should not be construed as being limiting in any way.

The server computer 102 can execute an operating system (not labeled in FIG. 1) and one or more application programs such as, for example, a controller application, module, service, or the like ("controller") 106. The operating system can include a computer program that can be executed by the server computer 102 (e.g., by the processor of the server computer 102) to control operations of the server computer 102. The controller 106 can include an executable program that can be configured to execute on top of the operating system to provide various functionality illustrated and described herein.

More particularly, the controller 106 can be configured to create and manage cross-service chains of functions, as will be illustrated and described in more detail herein. The controller 106 can be configured to receive a request 108 from a requestor 110. The request 108 can correspond to a chain request. As used herein, a "chain request" can correspond to a request to create a cross-service chain of multiple virtual network functions. As used herein, a cross-service chain includes routing or flows through at least two virtual network functions that can be associated with at least two different services and/or locations, in some embodiments. In some other embodiments, the virtual network functions can be components of a multi-site service and therefore can span multiple sites, as will be explained in more detail below. It should be noted that a cross-service chain of virtual network functions can include any number of virtual network functions over any number of sites and/or locations, though the concepts and technologies disclosed herein are described as being directed to cross-service chains of at least two virtual network functions from at least two sites. The cross-service chain can be used to enable routing of data across at least these two virtual network functions at different services and/or locations. According to various embodiments of the concepts and technologies disclosed herein, the requested cross-service chain can correspond to a flow or route through or across at least two virtual network functions 112A-A, 112A-B, . . . , 112A-N, 112B-A, 112B-B, . . . , and 112B-N (hereinafter collectively and/or generically referred to as "virtual network functions 112"). It should be noted that although the virtual network functions 112 are given the same reference numeral, that each of the virtual network functions 112 can have a different function relative to another virtual network function 112. In some other embodiments, the virtual network functions 112 can have similar or even identical functions relative to one another. For example, two or more of the virtual network functions 112 can be components of a multi-site service such as a firewall. It should be understood that this example is illustrative, and therefore should not be construed as being limiting in any way.

In some embodiments, the request 108 can also include a request for (or can prompt creation of) routing instructions 114 and/or labeling rules 116 to effect the cross-service chain requested. The server computer 102 can be configured to provide the routing instructions 114 and/or the labeling rules 116 to various entities operating on and/or in communication with the server computer 102 (and/or the network 104). The entities can be configured to use the routing instructions 114 and/or the labeling rules 116 to provide the desired data flow and/or routing associated with the cross-service chain, as will be illustrated and described in more detail herein.

Before explaining the functionality illustrated and described herein for chaining the virtual network functions 112 and/or creating, providing, and/or implementing the routing instructions 114 and/or labeling rules 116 to achieve the desired chaining, other elements of the operating environment 100 will be defined. As shown in FIG. 1, the operating environment 100 can include a first site 118A and a second site 118B (hereinafter collectively and/or generically referred to as "sites 118"). As will be appreciated with reference to the description herein, any number of sites 118 can be included in the operating environment 100, though in various embodiments at least two sites 118 are included. The illustrated embodiment of two sites 118 as shown in FIG. 1 is purely illustrative. The sites 118 can include data centers, server farms, or other computing resources that can operate on and/or in communication with the network 104. In some embodiments, though not separately labeled in FIG. 1, the sites 118 can be connected to the network 104 via one or more access networks. Thus, in the illustrated embodiment of FIG. 1, it should be understood that the network 104 includes one or more access networks, though this is not labeled in FIG. 1. It should be understood that this example is illustrative, and therefore should not be construed as being limiting in any way.

The sites 118 can include one or more virtual machines 120A-B (hereinafter collectively and/or generically referred to as "virtual machines 120"). Only two virtual machines 120 are shown in FIG. 1 due to space limitations, but as will be explained in more detail below, each component illustrated in the sites 118 can be deployed within its own virtual machine 120, and as such, the illustrated embodiment is illustrative and should not be construed as being limiting in any way. The virtual machines 120 can include virtual processing components (e.g., virtual processors) and virtual data storage components (e.g., virtual memory). Thus, it can be appreciated that the sites 118 can include one or more special purpose physical computing devices (e.g., computing devices that include at least a processor and a memory that are configured to provide the functionality associated with the virtual machines). The physical computing devices can execute and/or host the virtual machines 120. It should be understood that this example is illustrative, and therefore should not be construed as being limiting in any way.

The virtual machines 120 can be configured to host one or more components of one or more services 122A-B (hereinafter collectively and/or generically referred to as "services 122"). Each of the services 122 can include and/or can be provided by one or more virtual network function 112. As shown in FIG. 1, the services 122 and/or the virtual machines 120 can be in communication with one or more other physical network components to provide the functionality illustrated and described herein. Also, as shown, the services 122 can include cross-site services, meaning virtual network functions 112 associated with the services 122 can span multiple sites, in various embodiments. Again, each of the services 122 can include any number of virtual network functions 112. As such, it should be understood that the illustrated embodiment is illustrative and should not be construed as being limiting in any way.

In some embodiments, the services 122 and/or the virtual machines 120 can communicate with one or more devices such as one or more ingress edge servers 126A-B (hereinafter collectively and/or generically referred to as "ingress edge servers 126"). The ingress edge servers 126 can correspond to physical devices and/or virtual devices (e.g., hosted by a virtual machine 120 (not shown in FIG. 1)) that can receive data and/or other traffic that can be fed to the service 122, e.g., for data processing by the one or more virtual network functions 112. The ingress edge servers 126 can be configured to label traffic associated with the cross-service chains of virtual network functions as will be explained in more detail below. According to various embodiments of the concepts and technologies disclosed herein, the functionality of the ingress edge servers 126 can be invoked only one time in the lifetime of a packet that traverses a cross-site virtual network function chain, namely the first time the packet enters the chain (e.g., via an access network) as will be illustrated and described in more detail below.

In some embodiments, the services 122 and/or the virtual machines 120 also can communicate with one or more other devices such as one or more egress edge servers 128A-B (hereinafter collectively and/or generically referred to as "egress edge servers 128"). The egress edge servers 128 can correspond to physical devices and/or virtual devices (e.g., hosted by a virtual machine 120 (not shown in FIG. 1)) that can receive data and/or other traffic from the services 122 and/or the virtual machines 120. The egress edge servers 128 can be configured to remove labels from the traffic and/or the data. In various embodiments of the concepts and technologies disclosed herein, the ingress edge servers 126, the virtual network functions 112, and the egress edge servers 128 can be coupled to and/or can include their own routing functionality to route traffic associated with the cross-service chains of virtual network functions 112 to other devices such as, for example, other services 122, other virtual machines 120, and/or other entities. This forwarding functionality is illustrated in FIG. 1 as forwarding devices, modules, and/or functionality (hereinafter referred to simply as "forwarders") 124. As noted above, the forwarders 124 can be configured to route the traffic and/or data to other sites 118, other virtual machines 120, other services 122, and/or other entities such as virtual network functions 112. It should be understood that these examples are illustrative, and therefore should not be construed as being limiting in any way. According to various embodiments of the concepts and technologies disclosed herein, the functionality of the egress edge servers 128 can be invoked only one time in the lifetime of a packet that traverses a cross-site virtual network function chain, namely just before the packet exits the chain (e.g., is returned to the access network) as will be illustrated and described in more detail below.

It should be understood that although only two virtual machines 120 are shown in FIG. 1, it should be understood that each of the virtual network functions 112 and other components shown in FIG. 1 such as the forwarders 124, the ingress edge servers 126, the egress edge servers 128, and/or other components can be deployed in separate virtual machines 120. The illustrated arrangement is for simplicity only, as multiple virtual network functions 112 generally may not be deployed within a single virtual machine 120 as shown in FIG. 1. Therefore, the illustrated embodiment is illustrative only and should not be construed as being limiting in any way.

In practice, a user or other entity such as the requestor 110 shown in FIG. 1 can create and/or transmit a request 108 that is received by the server computer 102. As noted above, the request 108 can correspond to a request to create a cross-service chain of virtual network functions 112. In various embodiments, a user or other entity can access a device to create the request 108. Thus, the requestor 110 shown in FIG. 1 can correspond to a hardware device (having at least a processor and a data storage device such as a memory) that can be used to create the request 108, in some embodiments. In some other embodiments, the requestor 110 can correspond to an application that can generate the request 108 without interaction with a user or other entity.

The request 108 can be generated by the requestor 110. The request 108 can identify functionality desired in the cross-service chain of virtual network functions 112; specific types of virtual network functions 112 that the user or other entity would like to access and/or use for the desired functionality; types of virtual network functions 112 that data associated with the cross-service chain should traverse and/or be routed through; and/or otherwise can specify information that can be used to determine what sites 118, virtual network functions 112, and/or services 122 will be used to provide the functionality associated with the desired cross-service virtual network function chain. According to various embodiments, the request 108 can include at least information that identifies or can be used to identify two or more virtual network functions 112 that are to be accessed to provide the functionality requested by way of the request 108, where at least one of the two or more virtual network functions 112 is associated with a first of two or more services 122, and where a second one of the two or more virtual network functions 112 is associated with a second of the two or more services 122. It should be understood that this example is illustrative, and therefore should not be construed as being limiting in any way.

The server computer 102 can determine, via execution of the controller 106 and based upon the request 108, what sites 118 are to be included in the cross-service virtual network function chain. As explained above, the request 108 can indicate (or can be analyzed to determine) what functionality is to be included in the cross-service virtual network function chain. The server computer 102 also can obtain, from one or more network monitoring devices ("network monitor") 130 or other entities, network data and availability data ("network data") 132 to use in determining the cross-service chain and/or its associated flow. The network data 132 can include network topology information, network availability information, availability information associated with the virtual network functions 112 and/or data that describes functions associated with the virtual network functions 112, data that identifies and/or describes the services 122, data that identifies and/or describes the various edge servers and/or routers (e.g., the ingress edge servers 126 and/or the egress edge servers 128), other information, and/or the like. Based on the analysis, by the server computer 102, of the request 108 and the network data 132, the server computer 102 can determine a high level route for the requested chain.

As used herein, the phrase "high level route" can be used to refer to a route that specifies the sites 118 (and not necessarily the actual virtual network functions 112 that are to be accessed). As will be explained in more detail below, the sites 118 can be configured (e.g., by way of a local manager/controller (not shown in FIG. 1)) to assign the specific virtual network function 112 within the site 118 that will be used to provide functionality associated with the cross-service chain of virtual network functions 112. Thus, the server computer 102 can identify the sites 118 that will be included in the cross-service virtual network function chain. Of course, the identification of the sites 118 can be based on the network data 132 (e.g., by way of identifying the virtual network functions 112 and their respective sites 118), but the actual assignment of the virtual network function 112 can be left to the site 118 and/or the service 122 in various embodiments. This can be advantageous, in some embodiments, because the local controller or manager (or similar functionality) can be intimately aware of capabilities, capacities, and the like, and therefore can assign the virtual network functions 112 that most efficiently provide the requested functionality. Also, where multiple redundant services 122 and/or virtual network functions 112 exist, the local manager or controller can load balance and/or otherwise manage traffic within a site 118. It should be understood that this example is illustrative, and therefore should not be construed as being limiting in any way.

The server computer 102 can configure edge devices such as the ingress edge servers 126 and/or the egress edge servers 128 based on the high level route. According to various embodiments, the server computer 102 can generate routing instructions 114 and labeling rules 116. The labeling rules 116 can instruct the ingress edge servers 126 regarding labeling traffic associated with the cross-service virtual network function chain and/or can instruct the egress edge servers 128 regarding removing labels associated with the cross-service virtual network function chain. The routing instructions 114 can be generated to inform and/or instruct various entities (e.g., forwarders 124 associated with the ingress edge servers 126, virtual network functions 112, and/or the egress edge servers 128) of how traffic (e.g., a packet 134 or other data) will be or is to be routed through and/or among the sites 118, the services 122, and/or the virtual network functions 112 if traffic received by the ingress edge servers 126 and/or the egress edge servers 128 is associated with a particular cross-service chain of virtual network functions 112. Thus, for example, the routing instructions 114 can inform various entities of where traffic is to be routed in various embodiments. It should be understood that this example is illustrative, and therefore should not be construed as being limiting in any way.

According to various embodiments, the routing instructions 114 can be transmitted by the server computer 102 to the forwarders 124 associated with various entities to provide instructions for routing traffic associated with the cross-service virtual network function chains. Although the routing instructions 114 are only shown going to forwarders 124 associated with the site 118B, it should be understood that this is for simplicity of illustration only and that the routing instructions 114 can also be provided to other devices shown in FIG. 1 such as, for example, the forwarders 124 at the site 118A and/or other entities, as explained above. Thus, the illustrated embodiment should be understood as being illustrative and should not be construed as being limiting in any way.

In some embodiments, the routing instructions 114 can identify the sites 118 to which the traffic is to be routed if the traffic is determined to be associated with the cross-service virtual network function chain. Thus, the routing instructions 114 can, for example, list the sites 118 to which the traffic (e.g., the packet 134) is to be routed if the packet 134 (or other traffic) is determined to be associated with the cross-service chain of virtual network functions 112. According to various embodiments, the traffic can be determined to be associated with the cross-service chain of virtual network functions 112 by way of examining a header or other data that can be included with and/or can be a part of the traffic. It should be understood that this example is illustrative, and therefore should not be construed as being limiting in any way.

As explained herein, the virtual network functions 112 can be controlled by a local ("local" as used here refers to being local to a service 122, a virtual machine 120, and/or a site 118) controller or manager, but the server computer 102 can be configured to configure the virtual network functions 112 to act on the traffic (e.g., the packet 134) in accordance with the cross-service virtual network function chain. In some embodiments, as will be explained in more detail herein, the packet 134 and/or other traffic can be labeled and/or can be routed with information that identifies the sites 118, virtual machines 120, and/or virtual network functions 112 to and/or through which the packet 134 and/or traffic is to be routed to provide the routing instructions 114 to the virtual network functions 112. An ingress edge server 126 at a particular site 118 associated with a beginning of a cross-site virtual network function chain can also label the packet 134 to identify virtual network functions 112 at the sites 118 that will be used to provide functionality associated with the cross-service virtual network function chain. It should be understood that this example is illustrative, and therefore should not be construed as being limiting in any way.

As noted above, the server computer 102 can be configured to provide, to the edge devices (e.g., the ingress edge servers 126 and/or the egress edge servers 128) labeling rules 116. The labeling rules 116 can be used by the edge devices to configure labeling of the traffic (e.g., the packet 134). Thus, for example, a packet 134 can arrive at an edge device such as, for example, the ingress edge server 126A and the ingress edge server 126A can be configured to label the packet 134. In some embodiments, the ingress edge server 126A can label the packet 134 by adding or editing the header of the packet 134. In some embodiments, the header can be edited to include the route associated with the cross-service chain of virtual network functions 112. Thus, the labeling rules 116 can instruct the edge devices (e.g., the ingress edge servers 126 and/or the egress edge servers 128) regarding how the edge devices should label traffic such as the packet 134 and/or how to remove the labels after the packet 134 or other traffic has traversed the cross-service virtual network function chain. It should be understood that this example is illustrative, and therefore should not be construed as being limiting in any way.

To provide the routing as illustrated and described herein, a packet 134 can arrive at an edge device such as the ingress edge server 126B (as shown in FIG. 1). The ingress edge server 126B can label the packet 134 (e.g., by adding and/or editing the header to obtain a new header). The format of the header can be based on the routing instructions 114 and/or the labeling rules 116, in various embodiments. The packet 134 can be routed to the first virtual network function 112 in the cross-service chain of virtual network functions 112 (also referred to herein as a "cross-service virtual network function chain"). As noted above, the site 118 (e.g., a controller or manager located at the site 118 and/or otherwise associated with the site 118) can assign the specific virtual network function 112 to which the traffic is to be routed. Information that identifies the specific virtual network function 112 can be included in the header, if desired. In the example embodiment illustrated in FIG. 1, the packet 134 can be routed from the ingress edge server 126B (by a forwarder 124 associated with the ingress edge server 126B) to the virtual network function 112B-A. It should be understood that this example is illustrative, and therefore should not be construed as being limiting in any way. As will be more clearly understood hereinbelow, all forwarding within a cross-site virtual network function chain can be done by a forwarder 124. It should be understood that this example is illustrative, and therefore should not be construed as being limiting in any way.

After being routed to and/or through the virtual network function 112B-A, the packet 134 can be routed by the forwarder 124 associated with the virtual network function 112B-A to the forwarder 124 associated with the virtual network function 112A-B. The forwarder 124 of the virtual network function 112B-A can route the packet 134 to another site, e.g., the site 118A as shown in FIG. 1. In some embodiments, the packet 134 can be routed to a next virtual network function 112 in the cross-service virtual network function chain.

In the illustrated example embodiment, the packet 134 can be routed to the virtual network function 112A-B. The virtual network function 112A-B can process the packet 134 and the packet 134 can then flow to a forwarder 124 associated with the virtual network function 112A-B. The forwarder 124 can route the packet 134 to the egress edge server 128A. The egress edge server 128A can remove the labels (as in this example the flow through the cross-site virtual network function chain is finished). It should again be noted that the example shown in FIG. 1, wherein the packet 134 is routed to only two virtual network functions across only two sites 118, is illustrative and therefore should not be construed as being limiting in any way. Cross-service virtual network function chains as illustrated and described herein can include two or more virtual network functions 112 over two or more sites 118. In some embodiments, the header of the packet 134 can be modified by the egress edge server 128A to remove the routing information associated with the cross-service virtual network function chain, though this is not necessarily the case. It should be understood that this example is illustrative, and therefore should not be construed as being limiting in any way.

As shown in FIG. 1, a cross-service chain of virtual network functions 112 (labeled "cross-service chain 136" in FIG. 1) can schematically be shown as a list of all of the entities traversed by the packet 134. In the illustrated embodiment shown in FIG. 1, the cross-service chain 136 lists the ingress edge server 126B, the forwarder 124 (associated with the ingress edge server 126B); the virtual network function 112B-A, the forwarder 124 (associated with the virtual network function 112B-A); the virtual network function 112A-B, the forwarder 124 (associated with the virtual network function 112A-B); and the egress edge server 128A. It should be understood that this example is illustrative, and therefore should not be construed as being limiting in any way.

As shown in FIG. 1, the operating environment also can include a global event bus 138. It can be appreciated that the concepts and technologies disclosed herein may need, require, or desire to exchange control plane information across the various entities involved in providing the cross-service chain of virtual network functions 112. Thus, for example, the global event bus 138 can be used to support cross-site exchange of data and/or information. The global event bus 138 also can be configured to filter, restrict, and/or suppress some messages to prevent all recipients from being overwhelmed with messages. Thus, the global event bus 138 comprises hardware and/or software that can allow the exchange of messages and/or data between all entities involved in the cross-service chain of virtual network functions 112, as well as functionality for determining what messages and/or information should (or should not) be shared among the various entities. It should be understood that this example is illustrative, and therefore should not be construed as being limiting in any way.

FIG. 1 illustrates one server computer 102, one network 104, one requestor 110, two sites 118, two virtual machines 120, two services 122, and two forwarders 124. It should be understood, however, that various implementations of the operating environment 100 can include zero, one, or more than one server computer 102; zero, one, or more than one network 104; zero, one, or more than one requestor 110; zero, one, two, or more than two sites 118; zero, one, two, or more than two virtual machines 120; zero, one, two, or more than two services 122; and zero, one, two, or more than two forwarders 124. As such, the illustrated embodiment should be understood as being illustrative, and should not be construed as being limiting in any way.

Figure 2:
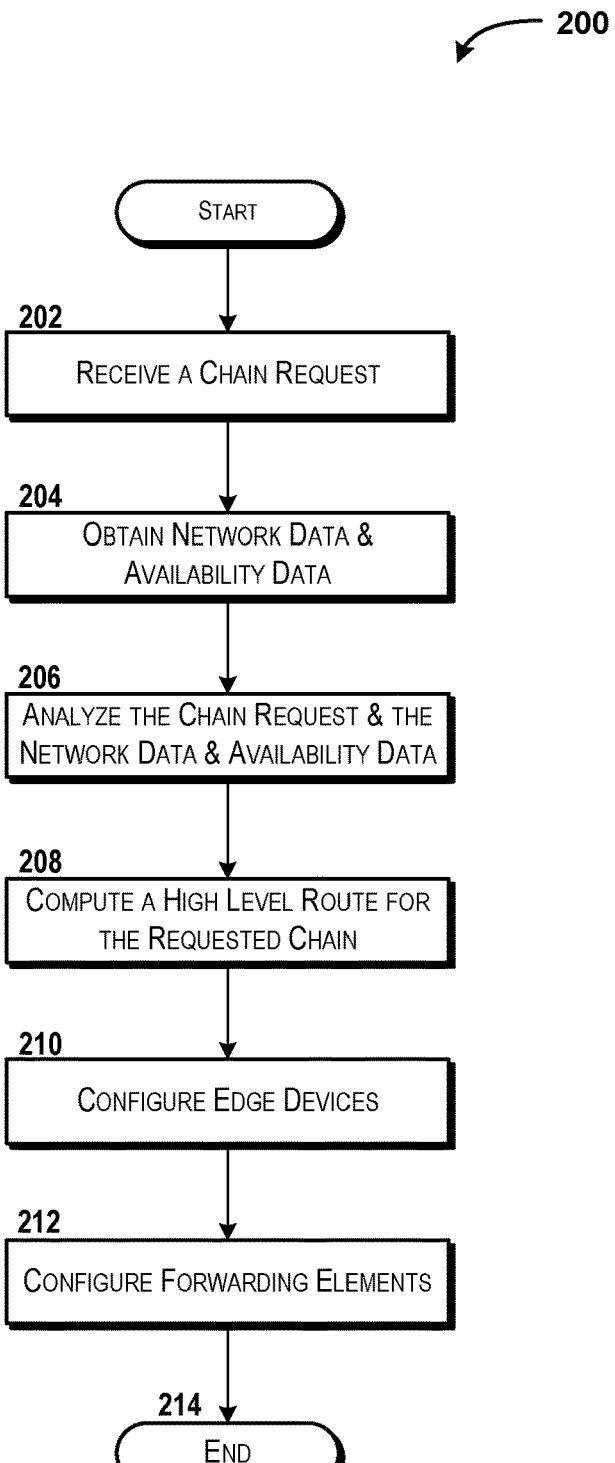
FIG. 2 is a flow diagram showing aspects of a method for creating cross-service chains of virtual network functions in a wide area network, according to an illustrative embodiment of the concepts and technologies described herein.

Turning now to FIG. 2, aspects of a method 200 for creating cross-service chains of virtual network functions 112 in a wide area network will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the server computer 102, to perform one or more operations and/or causing the processor to direct other components of the computing system or device to perform one or more of the operations.

For purposes of illustrating and describing the concepts of the present disclosure, the method 200 is described herein as being performed by the server computer 102 via execution of one or more software modules such as, for example, the controller 106. It should be understood that additional and/or alternative devices and/or network nodes can provide the functionality described herein via execution of one or more modules, applications, and/or other software including, but not limited to, the controller 106. Thus, the illustrated embodiments are illustrative, and should not be viewed as being limiting in any way.

The method 200 begins at operation 202. At operation 202, the server computer 102 can receive a chain request or other request for chaining of virtual network functions 112. In some embodiments, the request received in operation 202 can be similar or even identical to the request 108 illustrated and described in FIG. 1. As explained with reference to the request 108 in FIG. 1, the request received in operation 202 can be received from hardware, software, and/or a combination thereof, which can be associated with one or more entities such as the requestor 110. In some embodiments, the request received in operation 202 can define functionality desired in a cross-service virtual network function chain. In some other embodiments, the request received in operation 202 can identify specific virtual network functions 112 that should be traversed in accordance with the cross-service virtual network function chain. It should be understood that these examples are illustrative, and therefore should not be construed as being limiting in any way.

From operation 202, the method 200 can proceed to operation 204. At operation 204, the server computer 102 can obtain network data and availability data such as the network data 132 shown in FIG. 1. The network data and availability data obtained in operation 204 can indicate, for example, a network topology, network resource availability, topology and availability associated with virtual network functions 112, functionality associated with virtual network functions 112, identifications of sites 118, identifications of virtual machines 120, identifications of services 122, other information, combinations thereof, or the like. Thus, the network and availability data obtained in operation 204 can be used to identify virtual network functions 112 to be included in a cross-service virtual network function chain, availability associated with the virtual network functions 112, site locations associated with the virtual network functions 112, virtual machines 120 associated with the virtual network functions 112, combinations thereof, or the like.

From operation 204, the method 200 can proceed to operation 206. At operation 206, the server computer 102 can analyze the chain request received in operation 202 and the network data and availability data obtained in operation 204. The server computer 102 can analyze the chain request received in operation 202 to identify two or more virtual network functions 112 that are to be included in a cross-service virtual network function chain to satisfy the chain request (or the requested or specified functionality associated with the chain request). It should be understood that the identification of the virtual network functions 112 can include identifying a type of virtual network function 112 and/or a service 122, but not necessarily the actual virtual network function 112 as explained above. The server computer 102 can analyze the network data and the availability data to identify sites 118 that include virtual network functions 112 that can or will provide the requested functionality (or that are specified by the chain request), as well as to identify the virtual machines 120 and/or services 122 that include the type of virtual network functions 112 identified. Thus, in operation 206 the server computer 102 can determine how to satisfy the chain request as well as what sites 118, virtual machines 120, services 122, and/or virtual network functions 112 are to be included in the cross-service virtual network function chain. It should be understood that this example is illustrative, and therefore should not be construed as being limiting in any way.

From operation 206, the method 200 can proceed to operation 208. At operation 208, the server computer 102 can compute a high level route for the cross-service virtual network function chain that was requested by way of the chain request received in operation 202. As explained herein, the computation of a "high level route" can include the identification of the sites 118 to and/or via which traffic associated with the chain is to be routed. According to various embodiments of the concepts and technologies disclosed herein, computation of the high level route can omit identification of the specific virtual network functions 112 and/or other entities associated with those virtual network functions 112. Thus, the computation of operation 208 can include the identification of the sites 118, but not necessarily the identification of the virtual machines 120, the services 122, and/or the virtual network functions 112 to and/or through which the traffic is to be routed if associated with the chain requested by way of the chain request received in operation 202.

As explained above, the sites 118 and/or controllers, managers, and/or other entities associated with the sites 118 can be configured to identify the specific virtual machines 120, services 122, and/or virtual network functions 112 associated with the cross-service virtual network function chain. Thus, the high level route determined in operation 208 can be used to route traffic to a particular site 118, and entities associated with and/or located at the particular site 118 can be configured to identify the specific virtual network functions 112, virtual machines 120, and/or services 122 as illustrated and described herein. It should be understood that this example is illustrative, and therefore should not be construed as being limiting in any way.

In some embodiments of the operation 208, the server computer 102 also can determine and/or generate routing instructions 114 and/or labeling rules 116. The routing instructions 114 and/or the labeling rules 116 can be based on the high level route generated in operation 208, in some embodiments. For example, the routing instructions 114 can identify, for a specific cross-service virtual network function chain, that a packet 134 should go from Site A to Site B. It should be understood that this example is illustrative, and therefore should not be construed as being limiting in any way.

From operation 208, the method 200 can proceed to operation 210. At operation 210, the server computer 102 can configure two or more edge devices such as, for example, the ingress edge servers 126 and/or the egress edge servers 128. The server computer 102 can configure the edge devices to provide the functionality associated with the cross-service virtual network function chain. According to various embodiments, the server computer 102 can be configured to transmit the labeling rules 116 to the edge devices such as, for example, the ingress edge servers 126 and/or the egress edge servers 128. In some embodiments, the server computer 102 can be configured to transmit the labeling rules 116 directly to the edge devices. In some other embodiments, the server computer 102 can be configured to transmit the labeling rules 116 directed to the edge devices, for example by routing labeling rules 116 to the edge devices via one or more network devices, or the like. Because the server computer 102 can be configured to transmit or communicate the labeling rules 116 to the edge devices in additional and/or alternative ways, it should be understood that these examples are illustrative, and therefore should not be construed as being limiting in any way.

From operation 210, the method 200 can proceed to operation 212. At operation 212, the server computer 102 can configure two or more routing and/or forwarding elements associated with the edge devices and/or the virtual network functions 112. The server computer 102 can configure the two or more forwarders 124 associated with the edge devices and/or the virtual network functions 112 to provide the functionality associated with the cross-service virtual network function chain. According to some embodiments, the server computer 102 can be configured to transmit, to the forwarders 124, or directed to the forwarders 124, the routing instructions 114. The routing instructions 114 can inform the forwarders 124 how to route traffic (e.g., a packet 134) when the traffic is associated with the cross-service virtual network function chain. It should be understood that in some embodiments, the local controller or manager can add additional routing instructions 114 (e.g., identifying the specific virtual network functions 112 at the sites 118, etc.), and these routing instructions 114 can be provided to forwarders 124 as well to enable routing to the virtual network functions 112. Thus, it can be appreciated that the routing instructions 114 may indicate, for example, that traffic should be routed to a first virtual network function 112 and from there to a second virtual network function 112. Thus, the forwarders 124 can be configured by the server computer 102 (and/or the local manager or controller, etc.) to route traffic a particular way when the traffic is determined by the virtual network functions 112 to be associated with a cross-service virtual network function chain. It should be understood that this example is illustrative, and therefore should not be construed as being limiting in any way.

According to various embodiments of the concepts and technologies disclosed herein, the forwarding elements (e.g., the forwarders 124) can be provided by modules hosted by virtual machines 120 located at the sites 118; by modules included in the ingress edge servers 126, the egress edge servers 128, and/or the virtual network functions 112; and/or otherwise provided by various hardware and/or software associated with the site 118. The forwarders 124 can be instructed by the server computer 102 to route traffic associated with the cross-service virtual network function chain to an appropriate next hop (e.g., a virtual network function 112, an ingress edge server 126, a transport network or other part of the network 104, or the like). Thus, in operation 212 the server computer 102 can instruct the forwarding elements regarding how traffic associated with the cross-service virtual network function chain should be routed. It should be understood that this example is illustrative, and therefore should not be construed as being limiting in any way.

From operation 212, the method 200 can proceed to operation 214. The method 200 can end at operation 214.

Figure 3:
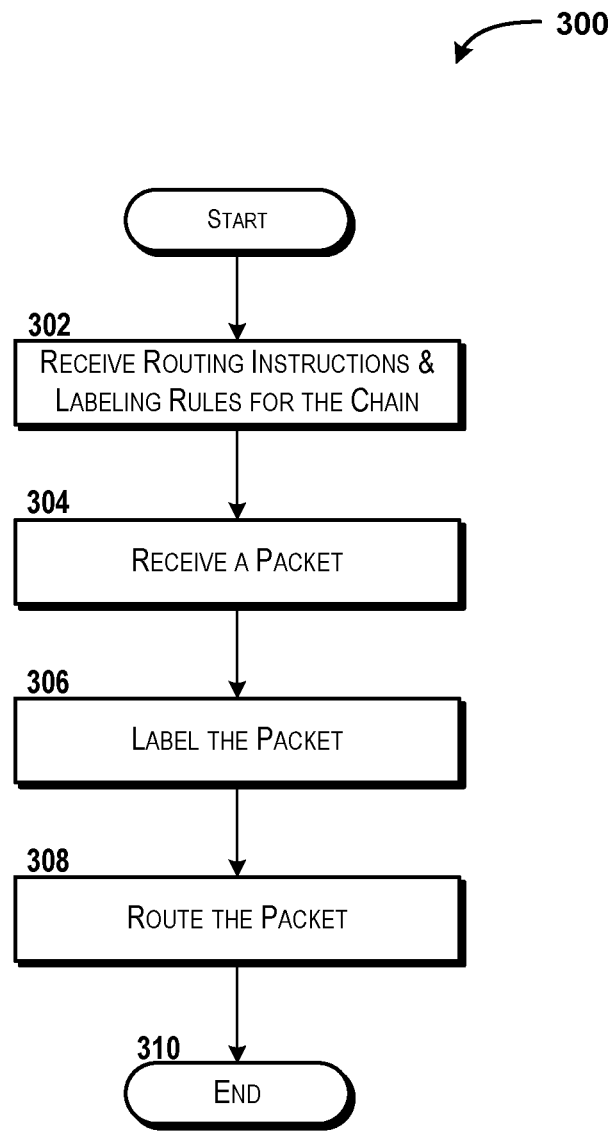
FIG. 3 is a flow diagram showing aspects of a method for labeling and routing traffic in a cross-service chain of virtual network functions in a wide area network, according to an illustrative embodiment of the concepts and technologies described herein.

Turning now to FIG. 3, aspects of a method 300 for labeling and routing traffic in a cross-service chain of virtual network functions in a wide area network will be described in detail, according to an illustrative embodiment. For purposes of illustrating and describing the concepts of the present disclosure, the method 300 is described herein as being performed by the ingress edge server 126 and/or a forwarder 124 associated with the ingress edge server 126. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 300 begins at operation 302. At operation 302, the ingress edge server 126 (or multiple ingress edge servers 126) and associated forwarders 124 can receive routing instructions and labeling rules, e.g., the forwarders 124 associated with the ingress edge servers 126 can receive the routing instructions 114 illustrated and described in FIG. 1 and ingress edge servers 126 can receive the labeling rules 116 illustrated and described with reference to FIG. 1. It can be appreciated that the routing instructions and labeling rules received in operation 302 by the ingress edge server 126 can be sent by the server computer 102 as illustrated and described above with reference to operation 210 of the method 200 illustrated in FIG. 2. Because the routing instructions and labeling rules can be sent at other times and/or by other devices, it should be understood that this example is illustrative and therefore should not be construed as being limiting in any way.

As explained above, the routing instructions and labeling rules received in operation 302 can be used to configure the ingress edge servers 126 and the forwarders 124 to recognize traffic as being associated with a cross-service virtual network function chain, to label the traffic, and/or to route the traffic. In particular, labeling rules can be used to inform the ingress edge servers 126 that traffic associated with a cross-service virtual network function chain should be expected and/or how to label traffic associated with the cross-service virtual network function chain. Similarly, the routing instructions can instruct the forwarders 124 regarding how to route traffic associated with the cross-service virtual network function chain. In various embodiments, the labeling rules can instruct the ingress edge servers 126 to label traffic (e.g., create or modify a header associated with a packet 134), and the routing instructions can instruct the forwarders 124 regarding routing associated with the cross-service virtual network function chain and/or how to route a packet 134 or other traffic associated with the cross-service virtual network function chain. Because the ingress edge servers 126 can be instructed to label traffic associated with the cross-service virtual network function chain in additional and/or alternative ways, and because the forwarders 124 can be instructed to route traffic associated with the cross-service virtual network function in additional and/or alternative ways, it should be understood that these examples are illustrative, and therefore should not be construed as being limiting in any way.

From operation 302, the method 300 can proceed to operation 304. At operation 304, the ingress edge server 126 can receive a packet such as the packet 134. The packet 134 can be associated with a cross-service virtual network function chain. The packet 134 can be received with information that indicates the association with the cross-service virtual network function chain (e.g., a header of the packet 134 can indicate the relationship; other information provided with the packet 134 can indicate the relationship, or the like). Thus, the ingress edge server 126 can receive the packet 134 in operation 304, and in some embodiments, the server computer 102 also can determine, in operation 304 or in other operations, that the packet 134 is associated with a cross-service virtual network function chain, though this is not explicitly labeled in FIG. 3. It should be understood that this example is illustrative, and therefore should not be construed as being limiting in any way.

From operation 304, the method 300 can proceed to operation 306. At operation 306, the ingress edge server 126 can label the packet received in operation 304, for example the packet 134. The ingress edge server 126 can label the packet 134 by adding information to a header, by creating a header, by modifying or adding data to the packet 134, by adding metadata to the packet 134, and/or in other ways. According to various embodiments, the ingress edge server 126 can label the packet received in operation 304 by adding a header or modifying an existing header. It should be understood that this example is illustrative, and therefore should not be construed as being limiting in any way.

From operation 306, the method 300 can proceed to operation 308. After operation 306, the packet 134 and/or other traffic associated with the cross-service virtual network function chain can flow to the forwarder 124 associated with the ingress edge server 126 (e.g., the ingress edge server 126 can process the traffic and then the traffic flows out of the ingress edge server 126 to the forwarder 124). At operation 308, the forwarder 124 can route the packet that was received in operation 304 and labeled in operation 306. According to various embodiments, the forwarder 124 can use the routing instructions 114 received in operation 302 to route the packet received in operation 304. In some other embodiments, the forwarder 124 can route the packet received in operation 304 based on the labeling completed in operation 306 (e.g., a new or modified header, etc.). Thus, in operation 308, the forwarder 124 can route the packet received in operation 304 to a next virtual network function 112 associated with the cross-service virtual network function chain or another entity (e.g., to an egress edge server 128, to another virtual network function 112, or the like). It should be understood that this example is illustrative, and therefore should not be construed as being limiting in any way.

While operations 304-308 have been described as occurring at an ingress edge server 126 and a forwarder 124 at one site 118, it should be understood that respective portions of the functionality illustrated and described herein with reference to operations 304-308 can be performed by various ingress edge servers 126 and/or various forwarders 124 that receive a packet associated with a cross-service virtual network function chain. Thus, it can be appreciated with reference to FIG. 1 that operations 304-308 (or similar operations) can be performed by the ingress edge server 126A, the ingress edge server 126B, other ingress edge servers 126, and various forwarders 124. It should be understood that this example is illustrative, and therefore should not be construed as being limiting in any way.

From operation 308, the method 300 can proceed to operation 310. The method 300 can end at operation 310.

Figure 4:
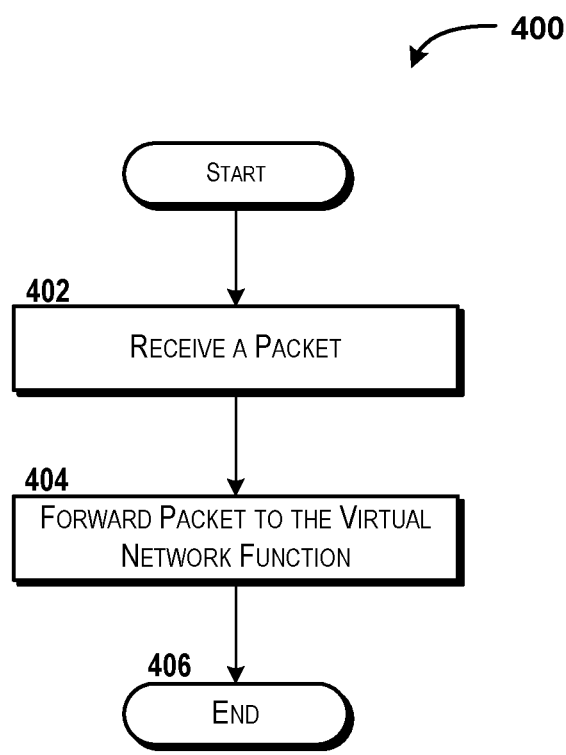
FIG. 4 is a flow diagram showing aspects of a method for routing traffic in a cross-service chain of virtual network functions in a wide area network, according to an illustrative embodiment of the concepts and technologies described herein.

Turning now to FIG. 4, aspects of a method 400 for routing traffic in a cross-service chain of virtual network functions in a wide area network will be described in detail, according to an illustrative embodiment. For purposes of illustrating and describing the concepts of the present disclosure, the method 400 is described herein as being performed by the forwarder 124. It should be understood that additional and/or alternative devices and/or network nodes can provide the functionality described herein via execution of one or more modules, applications, and/or by other software and/or hardware including, but not limited to, one of the edge devices such as the ingress edge servers 126, the egress edge servers 128, the virtual network functions 112, or other devices. Thus, the illustrated embodiments are illustrative, and should not be viewed as being limiting in any way.

The method 400 begins at operation 402. At operation 402, the forwarder 124 can receive a packet such as a packet 134. In some embodiments, the forwarder 124 can receive the packet from an ingress edge server 126, from a virtual network function 112, from an egress edge server 128, and/or from another device. Thus, for example, a packet received at operation 402 can be received after routing through a virtual network function 112. It should be understood that this example is illustrative, and therefore should not be construed as being limiting in any way.

In some instances, a forwarder 124 associated with a virtual network function 112 may receive a packet flowing from a virtual network function 112. Similarly, a forwarder 124 may receive a packet flowing from an ingress edge server 126. In some other instances, a forwarder 124 may receive a packet flowing from an egress edge server 128. Regardless of the source of the packet received in operation 402, the forwarder 124 can be configured to route packets to various destinations. Because the packet received in operation 402 can be received from various entities, it should be understood that these examples are illustrative, and therefore should not be construed as being limiting in any way.

From operation 402, the method 400 can proceed to operation 404. At operation 404, the forwarder 124 can forward the packet 134 to a destination such as, for example, a virtual network function 112, an egress edge server 128, another site 118, or the like. In some instances, the forwarder 124 can analyze a header of the packet 134 and forward the packet 134 to a next hop in the cross-service chain of virtual network functions 112. In some embodiments, for example, a forwarder associated with a virtual network function 112 can analyze a header or other information that describes routing of the traffic and route the traffic to another entity (e.g., a virtual network function 112, an ingress edge server 126, an egress edge server 128, or other entity) in accordance with the header or other information. It should be understood that these examples are illustrative, and therefore should not be construed as being limiting in any way.

From operation 404, the method 400 can proceed to operation 406. The method 400 can end at operation 406.

Figure 5:
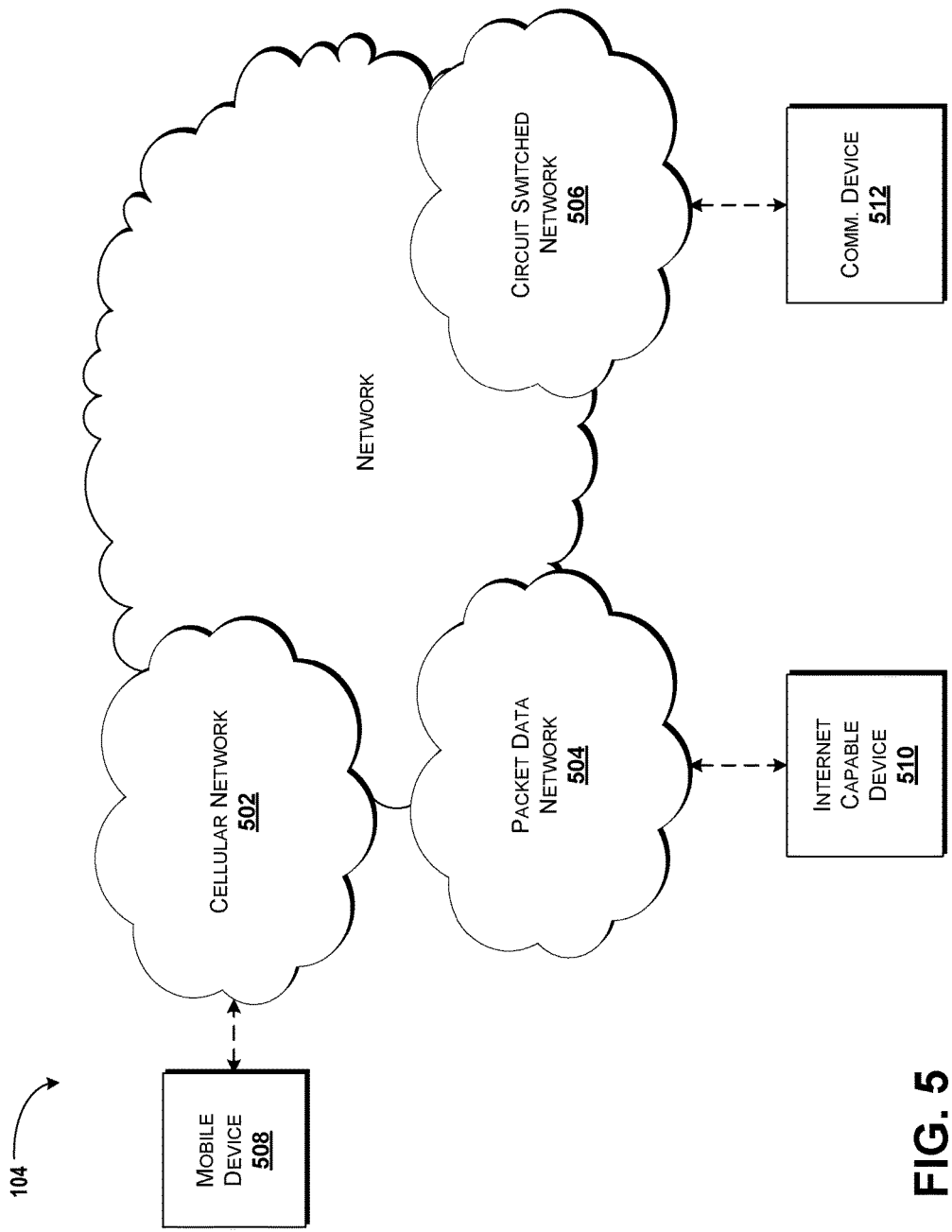
FIG. 5 schematically illustrates a network, according to an illustrative embodiment of the concepts and technologies described herein.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSDPA), and HSPA+. The cellular network 502 also is compatible with 4G mobile communications standards as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
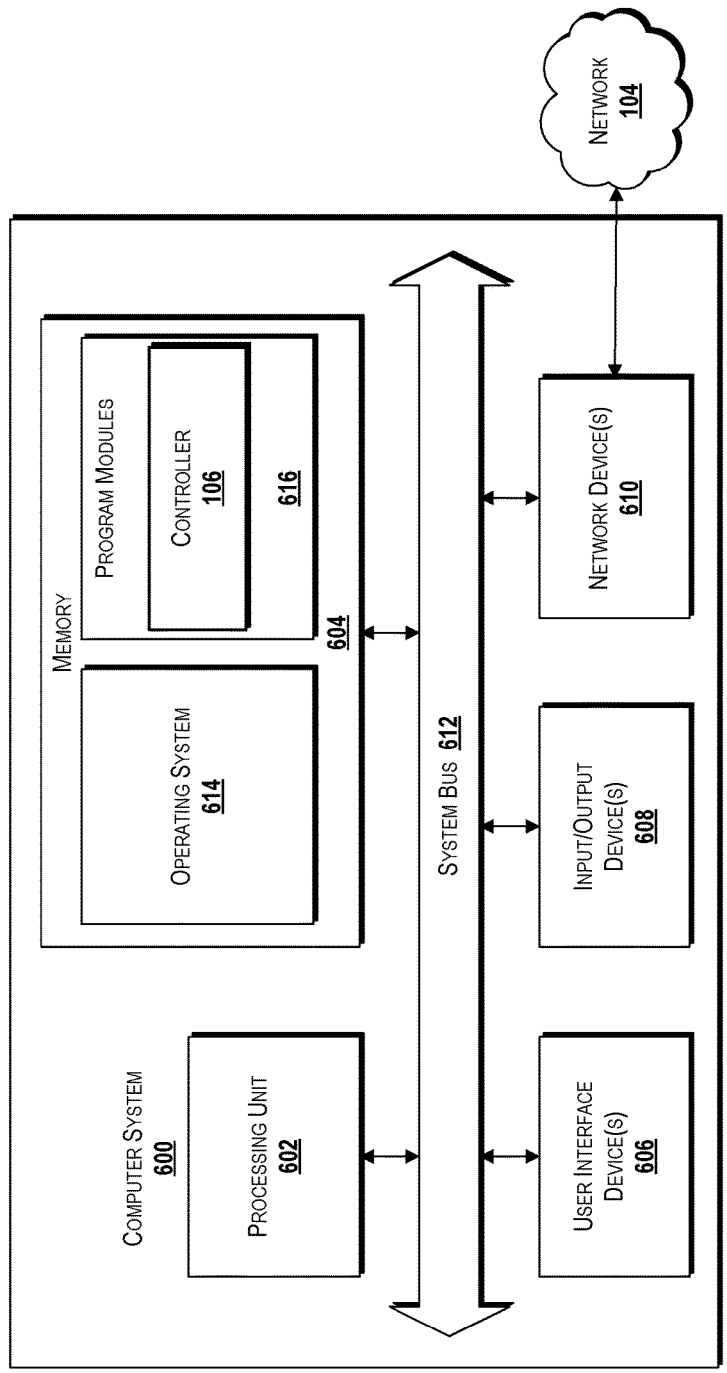
FIG. 6 is a block diagram illustrating an example computer system configured to provide functionality for creating cross-service chains of virtual network functions in a wide area network, according to some illustrative embodiments of the concepts and technologies described herein.

FIG. 6 is a block diagram illustrating a computer system 600 configured to provide the functionality described herein for creating cross-service chains of virtual network functions in a wide area network, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the controller 106 and/or modules for providing functionality associated with the ingress edge servers 126, the virtual network functions 112, the egress edge servers 128, the forwarders 124, the virtual machines 120, the services 122, combinations thereof, or the like. These and/or other programs can be embodied in computer-readable media containing instructions that, when executed by the processing unit 602, perform one or more of the methods 200, 300, and 400 described in detail above with respect to FIGS. 2-4 and/or other functionality as illustrated and described herein. It can be appreciated that, at least by virtue of the instructions embodying the methods 200, 300, 400, and/or other functionality illustrated and described herein being stored in the memory 604 and/or accessed and/or executed by the processing unit 602, the computer system 600 is a special-purpose computing system that can facilitate providing the functionality illustrated and described herein. According to embodiments, the program modules 616 may be embodied in hardware, software, firmware, or any combination thereof. Although not shown in FIG. 6, it should be understood that the memory 604 also can be configured to store the request 108, the routing instructions 114, the labeling rules 116, the network data 132, the packet 134, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can store the desired information and that can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for creating cross-service chains of virtual network functions in a wide area network have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
a processor; and
a memory that stores computer-executable instructions that, when executed by the processor, cause the processor to perform operations comprising
receiving a chain request that specifies functionality to be included in a service chain that is to be created, the functionality comprising a first function and a second function,
computing a route associated with the service chain, wherein the route specifies a first site that hosts a first service that provides the first function and a second site that hosts a second service that provides the second function, and
creating the service chain by
configuring a first edge device associated with the first site by providing labeling rules to the first edge device,
configuring a first forwarding device associated with the first edge device of the first site by providing routing instructions to the first forwarding device, and
configuring a second forwarding device associated with a first virtual network function and a third forwarding device associated with a second virtual network function by providing the routing instructions to the second forwarding device and to the third forwarding device, wherein a packet traverses the service chain by traversing the first edge device, the first forwarding device, the first virtual network function, the second forwarding device, the second virtual network function, and the third forwarding device.

2. The system of claim 1, wherein computing the route comprises:

obtaining, from a network device, network information comprising a network topology;

querying the first virtual network function and the second virtual network function to determine capacities associated with the first virtual network function and the second virtual network function; and computing, based on the network information and the capacities, sites associated with the route.

3. The system of claim 2, wherein the network device comprises a network monitor, and wherein the network information further comprises information that indicates availability associated with the first virtual network function and the second virtual network function.

4. The system of claim 1, wherein the packet further traverses a fourth forwarding device that is a component of a second edge device that is associated with the second site.

5. The system of claim 4, wherein the second edge device comprises an edge server associated with the second site.

6. The system of claim 1, wherein the first service comprises a plurality of virtual network functions comprising the first virtual network function.

7. The system of claim 1, wherein the first edge device is configured to receive a packet associated with the service chain, to label the packet, and to allow the packet to flow to the first forwarding device, which routes the packet to the first virtual network function.

8. The system of claim 7, wherein labeling the packet comprises adding the routing instructions to a header of the packet.

9. The system of claim 8, wherein an egress edge server removes the routing instructions from the header of the packet.

10. A method comprising:

receiving, by a server computer comprising a processor, a chain request that specifies functionality to be included in a service chain that is to be created, the functionality comprising a first function and a second function;

computing, by the processor, a route associated with the service chain, wherein the route specifies a first site that hosts a first service that provides the first function and a second site that hosts a second service that provides the second function; and creating the service chain by configuring, by the processor, a first edge device associated with the first site by providing labeling rules to the first edge device;

configuring, by the processor, a first forwarding device associated with the first edge device of the first site by providing routing instructions to the first forwarding device; and configuring, by the processor, a second forwarding device associated with a first virtual network function and a third forwarding device associated with a second virtual network function by providing the routing instructions to the second forwarding device and to the third forwarding device, wherein a packet traverses the service chain by traversing the first edge device, the first forwarding device, the first virtual network function, the second forwarding device, the second virtual network function, and the third forwarding device.

11. The method of claim 10, wherein computing the route comprises:

obtaining, from a network device, network information comprising a network topology;

querying the first virtual network function and the second virtual network function to determine capacities associated with the first virtual network function and the second virtual network function; and computing, based on the network information and the capacities, sites associated with the route.

12. The method of claim 10, wherein the packet further traverses a fourth forwarding device that is a component of a second edge device that is associated with the second site.

13. The method of claim 12, wherein the second edge device comprises an edge server associated with the second site.

14. The method of claim 10, wherein the first service comprises a plurality of virtual network functions.

15. The method of claim 10, wherein the first edge device is configured to receive a packet associated with the service chain, to add the routing instructions to a header of the packet, and to provide the packet to a forwarder that routes the packet to the first virtual network function.

16. A computer storage medium having computer-executable instructions stored thereon that, when executed by a processor, cause the processor to perform operations comprising:

receiving a chain request that specifies functionality to be included in a service chain that is to be created, the functionality comprising a first function and a second function;

computing a route associated with the service chain, wherein the route specifies a first site that hosts a first service that provides the first function and a second site that hosts a second service that provides the second function; and creating the service chain by configuring a first edge device associated with the first site by providing labeling rules to the first edge device;

configuring a first forwarding device associated with the first edge device of the first site by providing routing instructions to the first forwarding device; and configuring a second forwarding device associated with a first virtual network function and a third forwarding device associated with a second virtual network function by providing the routing instructions to the second forwarding device and to the third forwarding device, wherein a packet traverses the service chain by traversing the first edge device, the first forwarding device, the first virtual network function, the second forwarding device, the second virtual network function, and the third forwarding device.

17. The computer storage medium of claim 16, wherein computing the route comprises:

obtaining, from a network device, network information comprising a network topology;

querying the first virtual network function and the second virtual network function to determine capacities associated with the first virtual network function and the second virtual network function; and computing, based on the network information and the capacities, sites associated with the route.

18. The computer storage medium of claim 16, wherein the service chain further comprises a second edge device comprising an edge server associated with the second site, and wherein the packet also traverses a fourth forwarding device associated with the edge server.

19. The computer storage medium of claim 16, wherein the first service comprises a plurality of virtual network functions comprising the first virtual network function, and wherein the packet also traverses a fourth forwarding device associated with an egress edge server.

20. The computer storage medium of claim 16, wherein the first edge device is configured to receive a packet associated with the service chain, to add the routing instructions to a header of the packet, and to allow the packet to flow to the first forwarding device, which forwards the packet to the first virtual network function.

* * * * *